March 3, 1970     L. ROUMEJON     3,498,234
AERODYNAMICALLY-SUPPORTED TRAIN AND TRACK SYSTEM
Filed Aug. 10, 1967     2 Sheets-Sheet 2
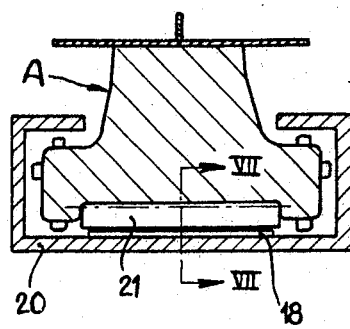
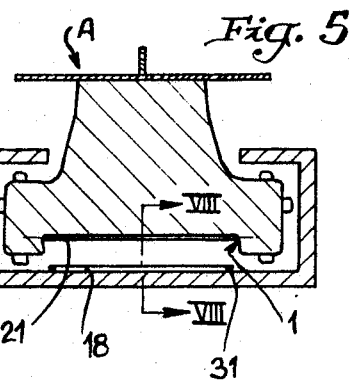
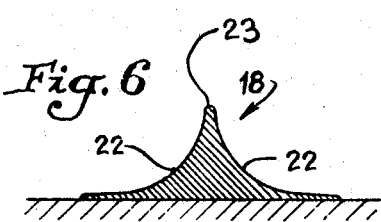
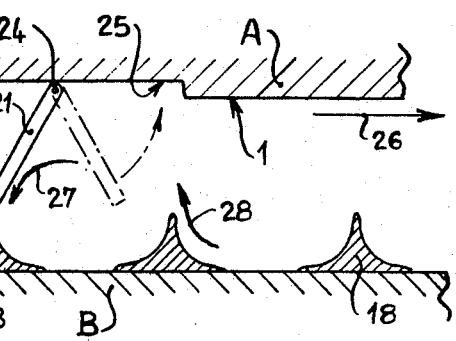
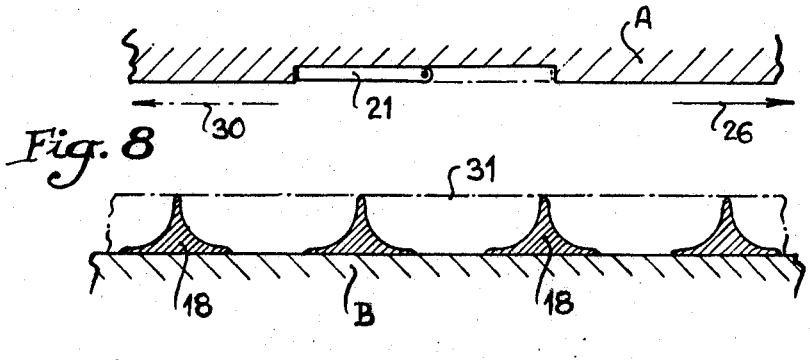

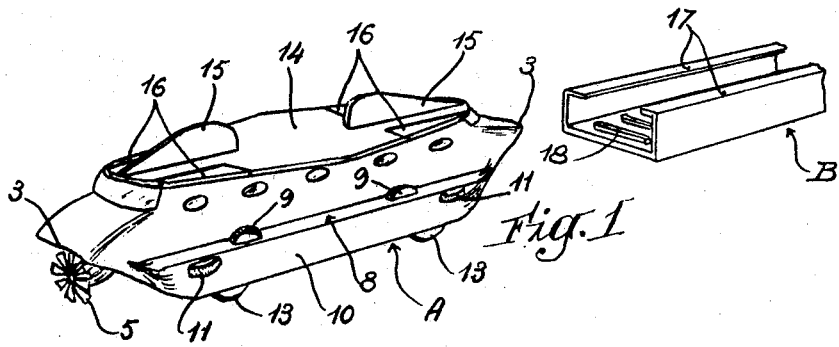
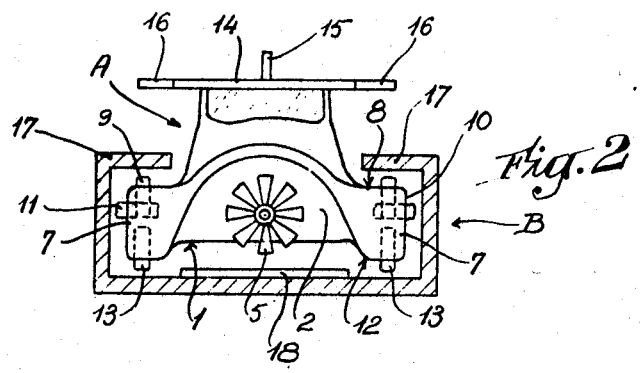
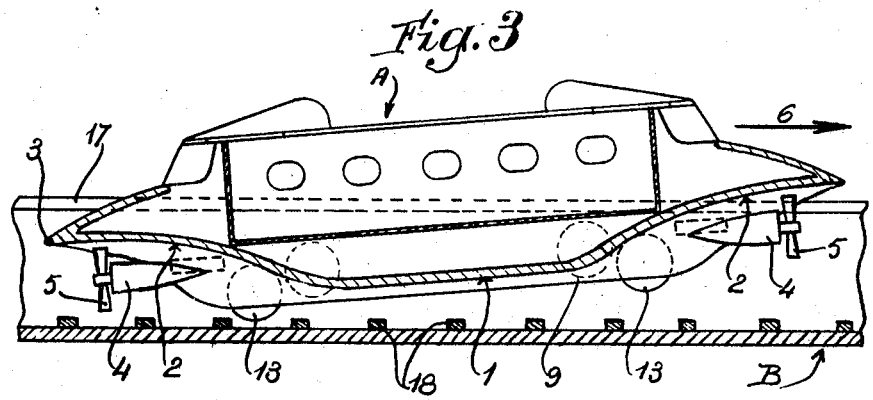

United States Patent Office 3,498,234
Patented Mar. 3, 1970

3,498,234
AERODYNAMICALLY-SUPPORTED TRAIN
AND TRACK SYSTEM
Leon Roumejon, 22 bis Blvd. de Bellevue,
Chambery, France
Filed Aug. 10, 1967, Ser. No. 659,640
Claims priority, application France, Sept. 5, 1966,
47,682; June 6, 1967, 48,756
Int. Cl. B60v 3/00; B61d 15/00; B61c 11/00
U.S. Cl. 104—23                                          5 Claims

ABSTRACT OF THE DISCLOSURE

An aerodynamic train including at least one self powered car having screws which produce air circulation within a U-shaped track. The air provides support and propulsion as it circulates under a longitudinal tunnel extending under the full length of the car and ending in domes at each end of the car. When the car is in motion, guide wheels located on the vehicle cooperate with a stabilizing wing with flaps, located on the roof of the vehicle, to keep the vehicle out of contact with the sides of the track.

BACKGROUND OF THE INVENTION

This invention relates to improvements in trains which are supported, while moving, by aerodynamic means. Trains or vehicles of this type are known in the art and generally include one or more fans blowing vertically downward in order to provide support, and one or more air screws which are used to move the vehicle. This method of operation involves numerous disadvantages the first of which is a vehicle of rather complicated and unusual design caused by the necessity of installing fans which have a vertical axis. Cooperating supply conduits and exhaust ducts must also be provided. In addition, separate means are needed to provide for support and propulsion of the train and this makes it practically mandatory to use the air screw, whose operation is very noisy. Moreover, the currently known systems have given rise to the escape of rather large volumes of air which make it is necessary to use supporting fans that must be excessively powerful.

Another disadvantage of the known systems is the inability of a single vehicle, provided with aerodynamic support and propulsion means, to move one or more trailer vehicles which are not equipped with similar support means. A main feature of this invention therefore, is the elimination of these disadvantages by providing for an aerodynamically supported train having a particularly small amount of escaping air, where the air issuing from the vehicle from a single source serves to both support and propel the vehicle.

The vehicle of the present invention comprises, at its front and rear ends, streamlined tunnel which taper downwardly toward the center of the vehicle and in which are located a moving screw or propellar having an essentially horizontal axis. Vertical and lateral guide wheels used when starting or stopping are attached to the vehicle and operate within a U-shaped track or runway. The vertical sides of the track include horizontal inwardly directed shoulders along their top portions which cooperate with the top vertical guide wheels of the vehicle. Rib members are transversely arranged on the bottom of the track in an area between the wheels of the vehicle in order to provide improved propulsion characteristics. In order to improve the aerodynamic supporting characteristics of the vehicle the top of it is equipped with a stabilizing wing which is oriented in a horizontal position when the vehicle is stopped. The wing is provided with rudders which cooperate with the aerodynamic forces of the engine to control both the vertical and horizontal direction of the vehicle.

In another embodiment of the invention provision is made for a servo-system to cooperate with each of the guide wheels and the elevator and directional rudders of the wing so as to automatically center the vehicle in the track when contact is made between any of the guide wheels and the inside faces of the track. The vehicle is thereby solely supported by air at all times.

According to the preferred embodiment of the invention, the wing has a substantially flat shape which permits the vehicle to move both forward and backward, by slightly changing the inclination of the vehicle so as to confer upon the wing the incidence necessary for the development of aerodynamic lift.

According to yet another embodiment the lower tunnel of each vehicle is provided with at least one deflection flap which can be oriented around an upper transverse horizontal axis to cooperate with the transverse tie members on the bottom of the track. In this embodiment the tie members have double concave profiles meeting in a common line on the top of each tie member. Using this arrangement, a servo-system can be provided which will progressively depress the deflection flap until it is completely lowered. The air flow is thereby oriented against the concave faces of the rib members on the track causing ascending air currents which aids both propulsion and support of the vehicle.

The attached drawing, is offered to provide understanding of the invention, its characteristic features, and the advantages which it offers.

FIGURE 1 is a perspective view, showing a schematic diagram of a vehicle car according to the invention as well as a section of the corresponding track.

FIGURE 2 is a transverse cross section of the track in which the car has been illustrated in operating position.

FIGURE 3 is a longitudinal section showing the car in the course of movement, the angle of incidence here having been greatly exaggerated so as to help in understanding the drawing.

FIGURE 4 is a schematic front sectional view of the moving car having the deflection flaps in lowered position while moving at a relatively slow speed.

FIGURE 5 is a front sectional view having the deflection flap in raised position for high speed.

FIGURE 6 is a transverse cross section through the bottom of the track, showing the detail of one tie member.

FIGURE 7 is a cut along VII—VII (FIGURE 4).

FIGURE 8 is a cut along VIII—VIII (FIGURE 5).

FIGURES 1–3 present car A with aerodynamic cushioning intended to move within a track B, according to the invention. Tunnel 1 extends under the entire length of car A and ends in tapered streamlined domes 2 at both the front and rear of the car body. The domes 2 form channels having aerodynamic profiles which rise toward their corresponding end of the car defining nozzles 3. In each of these channels is placed a fixed support 4 for a rotating screw 5. The two screws 5 are placed in rotation by motor means not shown and both turn in such a direction that the resultant forces cooperate to cause car A to move, for example, in the direction shown in FIGURE 3 by arrow 6. However it is obvious that car A is designed symmetrically at its two ends, so that it can move in either direction, both forward and backward.

On either side of tunnel 1 and domes 2, car A is equipped with longitudinal compartments 7 which are shaped to fit exactly as possible into the section of track B which shall be discussed later. Each compartment 7 has an upper horizontal face 8 above which extend at least two guide wheels 9 with horizontal axis, a vertical lateral face 10 out of which extend at least two lateral guide wheels 11 with vertical axis, and a horizontal lower face 12, below which extend at least two carrier wheels 13, with horizontal axis.

The top of car A consists of a flat wing 14 which assumes an essentially horizontal direction when the train is stopped. This wing 14 has forward and backward directional flaps 15 and elevator or vehicle direction flaps 16 whose orientation can be controlled manually by the car operator or preferably in an automatic fashion, in response to the obstacles encountered by wheels 9, 11 or 13, as will later be indicated.

The track B has a U-shaped cross section and two horizontal inwardly directed rims 17 located on the upper portion of the vertical side walls. On the horizontal bottom of track B are located on a series of transverse ribs 18 which rise upward, between wheels 13.

When the train is stopped, wheels 13 of car A rests on either side of transverse ties 18 on the bottom of track B. When screws 5 are started the car moves forward and, as the speed is gradually increased, the air rushes under dome 2 of the forward channel. This produces a vertical component or an aerodynamic lifting force which tends to raise the forward portion of the train. It is readily seen that the air flow obtained due to the action of screws 5 is used not only to carry car A but also to move it forward. This car assumes a slight inclination which gives wing 14 a certain incidence, as shown in FIGURE 3. In a state of equilibrium, car A moves without any of wheels 9, 11 or 13 coming into contact with the interior of track B. If one of these wheels touches track B, an automatic detection system, by means of a servo-mechanism, produces the rotation or oscillation of one or more flaps 15 or 16, thereby slightly deflecting car A and returning it to the normal position in which there is no contact by any wheels with track B.

As was explained earlier, the rims 17 of track B are bent toward each other above compartments 7, thereby reducing the lateral escape of air to an insignificant total. Consequently a flow of air is produced only inside track B and under car A. This enables car A to pull one or more trailers which are not equipped with air producing motors. The lower portion of these trailers need only to be suitably designed in terms of aerodynamics with domes 2 and a longitudinal tunnel 1.

FIGURES 4–8 show an embodiment intended to improve the support and the propulsion of car A. For this purpose, an orientable deflection flap 21 is arranged across tunnel 1 and members 18 have double-concave cross sections shown in FIGURES 6–8. More specifically each tie member 18 has the shape of a cylinder whose directrix consists of two curve arcs 22, oriented back to back. Each of these concave arcs 22 faces upward and are connected at a point 23 to which corresponds the upper edge or generatrix of the tie member 18.

The orientable flap 21 is attached at its top to a horizontal axis 24 which is arranged transversally in the ceiling of tunnel 1. A servo-device, not shown here, makes it possible to fix or to vary the orientation of flap 21 as desired. According to one preferred embodiment, we provide the ceiling of tunnel 21 with a depression 25 which enables us to completely retract flap 21 by lowering it downward or moving it upward, for high-speed travel.

In operation car A moves forward on track B, for example, in the direction indicated in FIGURES 7 and 8 by arrow 26. Flap 21 is oriented by at first giving it a slight inclination toward the rear (FIGURE 7). In this phase of slow-speed motion, flap 21 deflects the air streams downward, as indicated by arrow 27, and this produces upward currents on the level of the anterior concave face of the tie members 18 (arrows 28). These rising currents facilitate the support of car A which thus rapidly takes off even from relatively slow speeds (FIGURE 4). As the speed increases gradually, the servo-control progressively retracts flap 21 by lowering it along the direction of arrow 29. At high speeds, flap 21 is completely withdrawn into the ceiling of tunnel 1 (FIGURES 5 and 8).

If car A happens to be running in the opposite direction, that is, for example, in the direction indicated by arrows 30, corresponding to a backup movement, then the servo-control gives flap 21 an inclination oriented in the opposite direction. This inclination varies progressively from one to the other of the positions illustrated by fixed and dot-dash lines of FIGURES 7 and 8. This time, the air streams are supported on the posterior concave face of ties 18.

We can see that the particular profile of ties 18 and the use of the orientable deflection flap 21 make it possible to produce a favorable modification in the ground effect and to produce rising currents, which of course simultaneously improves the cushioning and propulsion of the train.

It should be pointed out that the preceding description was only by way of example and that it in no way restricts the scope of this invention. It is obvious that the present invention is applicable to any equivalent structure of a vehicle car in any general shape, particularly on the basis of its weight and dimensions.

What is claimed is:

1. A train with aerodynamic propulsion and support means which includes at least one self powered car (A), comprising: a lower tunnel (1) extending under the entire length of the vehicle and opening downwardly thereof (A), the tunnel having both front and rear ends formed into channels having streamlined domes (2) which open downwardly as a part of the tunnel, a fixed support (4) for a rotating screw (5) located within each of the domes, the two screws (5) designed to rotate in such a direction that their resilient forces will cooperate to produce movement of vehicle (A) within a track (B), the track (B) having a U-shaped cross section and inwardly directed horizontal rims (17) arranged on the top portion of the track (B) side walls.

2. An aerodynamic train as presented in claim 1 wherein: car (A) is provided with longitudinal compartments (7) in its lower portion on both sides of the car (A), the shape of which will fit into the corresponding area of track (B), each compartment (7) including a horizontal upper face (8) above which extend at least two guide wheels (9), a vertical lateral face (10) beyond which extend at least two lateral guide wheels (11), and a lower horizontal face (12) under which extend at least two carrier wheels (13).

3. A train with aerodynamic propulsion and support means which includes at least one self powered car (A), comprising: a lower tunnel (1) extending under the entire length of the vehicle and opening downwardly thereof (A), the tunnel having both front and rear ends formed into channels having streamlined domes (2) which open downwardly as a part of the tunnel, a fixed support (4) for a rotating screw (5) located within each of the domes, the two screws (5) designed to rotate in such a direction that their resultant forces will cooperate to produce movement of vehicle (A) within a track (B), the track (B) having a U-shaped cross section and inwardly directed horizontal rims (17) arranged on the top portion of the track (B) side walls, with a series of fixed transverse tie members (18) arranged on the horizontal bottom of the track (B), each transverse tie (18) having the shape of a cylinder whose directrix includes two curved arcs (22) oriented back to back, on either side of a common upper line (23).

4. An aerodynamic train according to claim 3 wherein: at least one orientable flap (21) attached at its top around an axis (24) is transversely arranged in the ceiling of the tunnel (1).

5. A aerodynamic train according to claim 3 wherein: car (A) is equipped on its top with a flat wing (14), provided with elevator flaps (16) and directional flaps (15) all of which can be oriented.

References Cited

UNITED STATES PATENTS

| | | | |
|---|---|---|---|
| 1,685,035 | 9/1928 | Robertson | 104—23 |
| 2,864,318 | 12/1958 | Toulmin | 105—74 |
| 3,369,497 | 2/1968 | Driver | 104—23 |

FOREIGN PATENTS

| | | |
|---|---|---|
| 219,133 | 12/1956 | Australia. |
| 1,275,533 | 10/1961 | France. |

ARTHUR L. LA POINT, Primary Examiner

H. BELTRAN, Assistant Examiner

U.S. Cl. X.R.

104—134; 105—74